FIG.1

INVENTOR.
MELVIN OLAND ALLEN
BY Ely Silverman
ATTORNEY

INVENTOR.
MELVIN OLAND ALLEN
BY
Ely Silverman
ATTORNEY

INVENTOR.
MELVIN O. ALLEN
BY
Ely Silverman
ATTORNEY

United States Patent Office 3,480,833
Patented Nov. 25, 1969

3,480,833
POLYPHASE SYSTEM PROTECTIVE RELAY
ASSEMBLY AND CALIBRATING APPARATUS THEREFOR
Melvin Oland Allen, Randall County, Tex., assignor of twenty-four percent to Joe H. Gidden, nine percent to West Texas State Bank, Trustee for Howard Eugene Gidden, ten percent to West Texas State Bank, Trustee for Maureen Elizabeth Gidden, and nine percent to West Texas State Bank, Trustee for David William Gidden, all of Canyon, Tex.
Filed Aug. 9, 1967, Ser. No. 659,413
Int. Cl. H02h 5/00, 3/00
U.S. Cl. 317—22                                8 Claims

ABSTRACT OF THE DISCLOSURE

A protective apparatus comprising a plurality of coacting and rapidly acting thermal delay and electromagnetic relay circuits sensitive to small voltage increments in each phase of a polyphase system and acting to disconnect polyphase actuated apparatus from under voltage conditions therein and providing for reconnection of the apparatus to the system after a predetermined time from correction of the abnormal condition. Also, the method of and apparatus for testing the completed protective apparatus, its subassemblies and its components.

BACKGROUND OF THE INVENTION

Fields of the invention

A protection device with time delay means operative through thermal and electromagnetic relays, and the apparatus for and process of calibrating such device.

Description of the prior art

On lowering of voltage across any one of a plurality of phases in an electrical polyphase power system the increase in current passed through a motor fed by such system lasts well over 30 seconds by available equipment prior to release of the circuit in response to such change in condition; such delays cause insulation heating and breakdown and result in motor failure. Additionally, the usual immediate restarting in such present conventional compensatory equipment does not alleviate this situation. Rapid (2 to 3 second) circuit release on precise (±1 volt) loss of voltage as is accomplished by the invention herein by a sturdy field unit and in a readily adjusted system has not heretofore been available although the cost of labor and equipment for repairs resulting from these failures is substantial.

SUMMARY OF THE INVENTION

In a polyphase control circuit system for protection of apparatus actuated thereby, a first thermal time delay relay with a very small open-close differential in a predetermined voltage range is located in a circuit including a resistance and sensitive to voltage of one phase of the input polyphase system and controls a second relay; the resistance is by-passed by the closure of circuit in first relay with a concomitant sharp increase of voltage and resultant avoiding of chatter across the first thermal relay and locking of that relay by that action of the second relay. Another thermal delay relay is provided with a generally similar circuit for other, second, group of phases of the input and is similarly sensitive to a small voltage change in a predetermined voltage range across that other, second, group of input phases and is coupled with the same second relay. Thereby, on failure, as determined by voltage fall into a predetermined range, of any phase of the system being monitored for a predetermined short time interval the load will be sharply and firmly disconnected from the polyphase circuit through a pilot circuit connected to the second relay. The pilot circuit is not reconnected to the input until proper input voltages are regained for a predetermined time period and then reconnection is without chatter and in a sharply defined voltage range.

The apparatus of this invention not only corrects for these conditions that might harm such equipment but also serves to count and signal these situations. Additionally it is adjustable for a wide variety of operative conditions.

One object of the invention is to provide a reliable and sturdy protective assembly for electrical apparatus using a polyphase energy source with a sharp (i.e. narrow voltage range), for disconnection and a sharp reconnection after a predetermined time of normal operation of the system.

Another object of this invention is to provide an apparatus for rapidly and reliably calibrating the above described protective apparatus.

DESCRIPTION OF THE PREFERRED EMBODIMENTS

Figure 2:
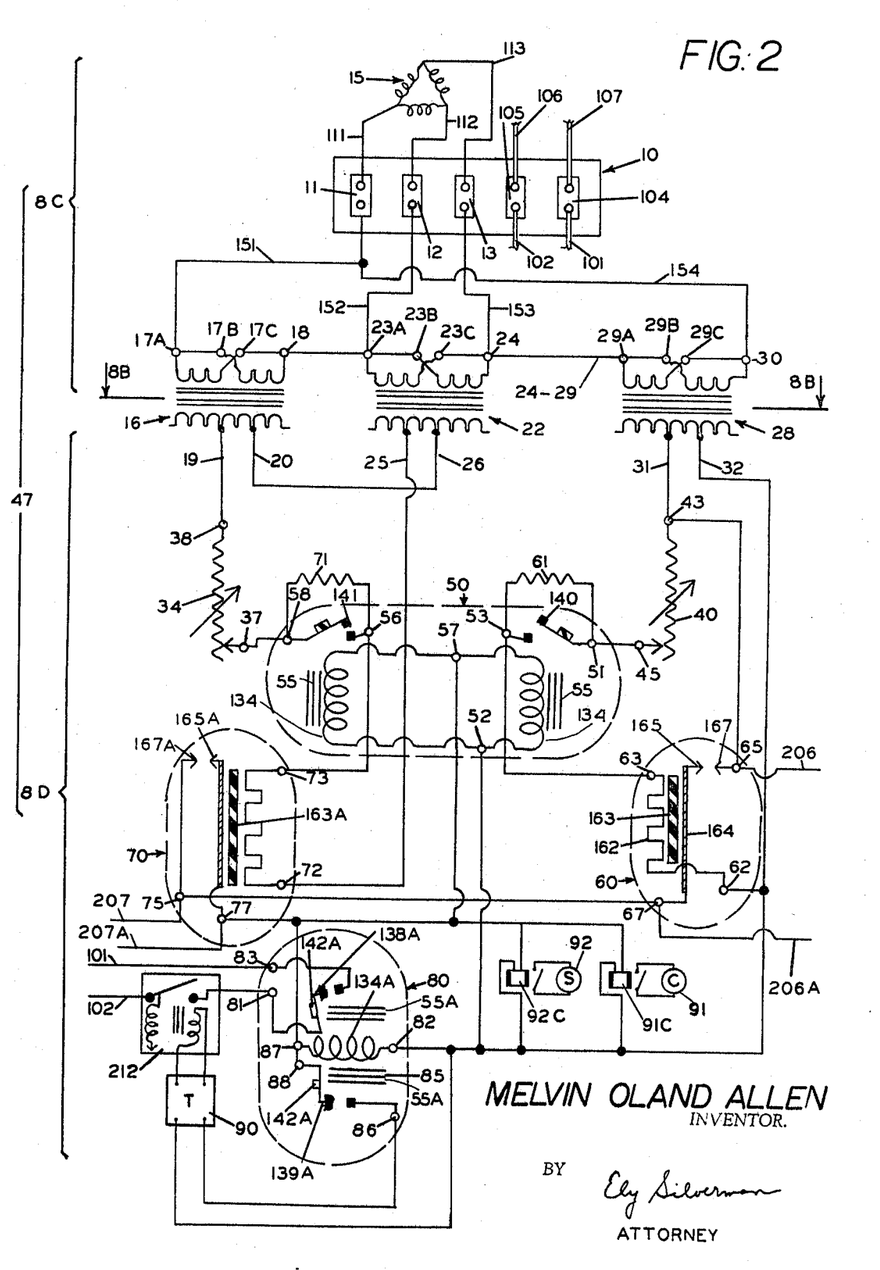
FIGURE 2 is a schematic wiring diagram of the apparatus 47 as it is used as shown in FIGURES 9 and 10.
Figures 9, 10:
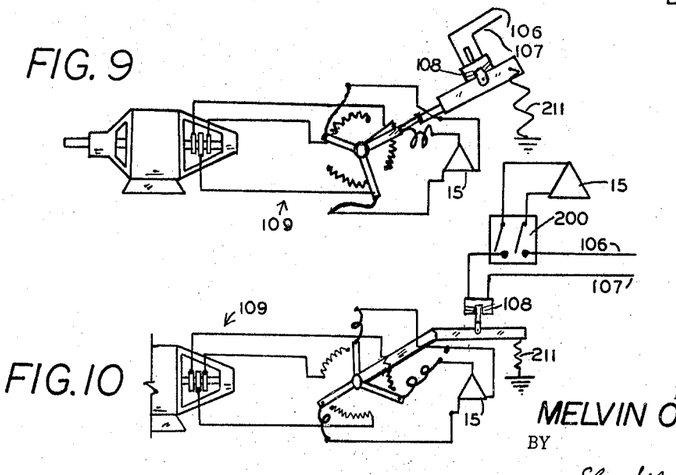
FIGURE 9 is a wiring diagram of a motor control unit operatively connected to lines 106 and 107 of apparatus 47, parts of the unit being in the running position of the unit.
FIGURE 10 shows the same parts of apparatus as shown in FIGURE 9 in the starting position of the motor control unit.

The apparatus 47 of this invention is comprised of elements operatively connected as in FIGURE 2 and functioning to provide the sequence of operations tabulated in Table I (column 8 hereof) and shown in FIGURES 9 and 10.

Figure 1:
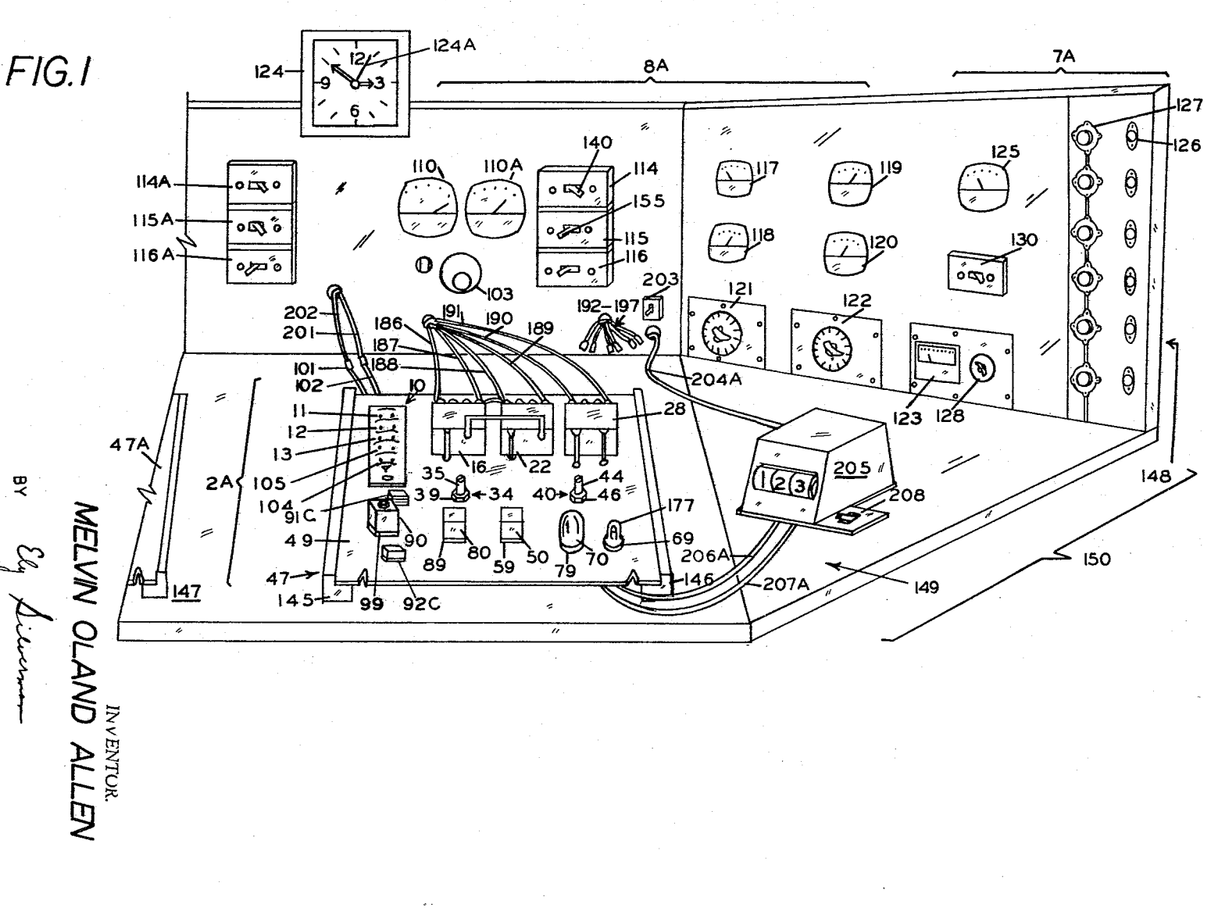
FIGURE 1 is a perspective view of the apparatus 47 as located in relation to the test panel arrangement therefor; apparatus 47 is shown in the array in which it is tested.
Figure 8:
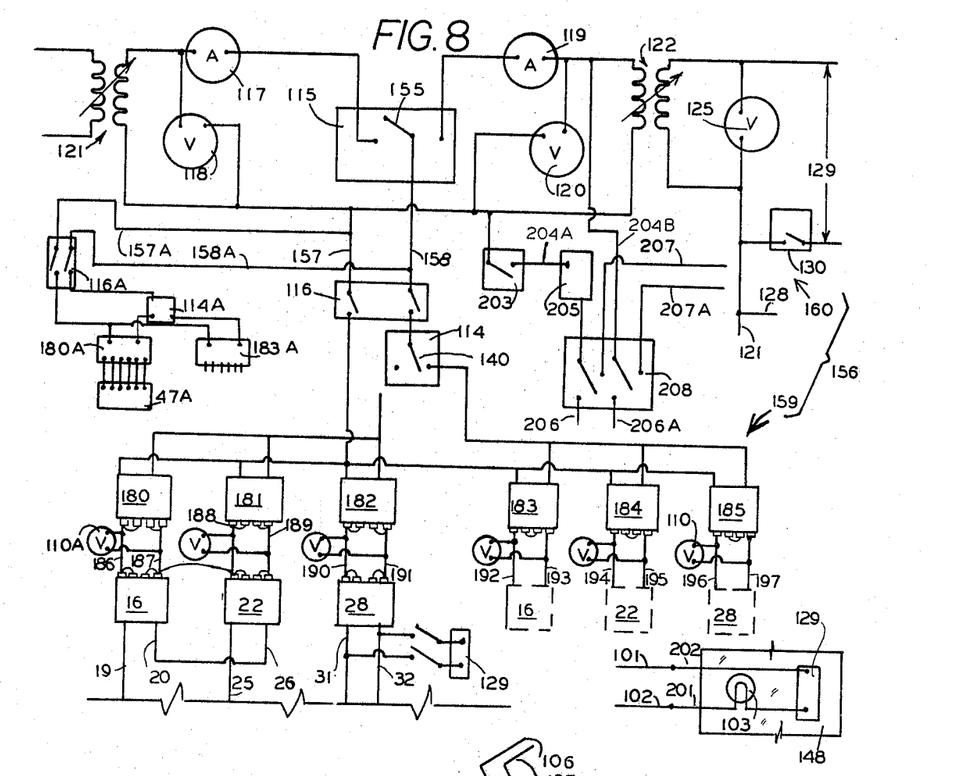
FIGURE 8 is a wiring diagram of the test panel circuit in zone 8A of FIGURE 1.

The rearrangement of portions of apparatus 47 shown in FIGURE 1 for the calibration thereof uses the operative connections of voltage supply and regulations thereof and timing device as shown in FIGURE 8 and the sequence of steps or operations tabulated in Table II (column 8).

Details of the embodiment 47 are provided in Table III (column 11).

Control circuit embodiment 47 comprises a base panel 49, a terminal block 10, like transformers 16, 22, and 28, like variable resistances 34 and 40, like thermal relay tubes 60 and 70, like relays 70 and 80 and a timer 90, counter 91 and signal 92.

Base panel 49 is a standard rigid steel sheet flat and smooth on both sides and provided with holes for location of sockets for the herein mentioned block, tubes, transformers and potentiometers. Sockets 59, 69, 79, 89, and 99 are firmly attached to base panel 49 and insulated therefrom. Block 10 is a standard insulated terminal block provided with separate terminals bars 11, 12, 13, each with one screw for attachment to input leads 111, 112 and 113 and, at each terminal, another screw for attachment to one end of a wire as 151, 152, 154, 153, each leading to a transformer terminal and terminal bars 104 and 105, each with screws at each end for connection to interior pilot lines 101 and 102 and exterior pilot control lines 106 and 107; in operation lines 106 and 107 are operatively connected to a holding coil 108 for a motor starting circuit 109.

Each of the terminals 11, 12, and 13 of terminal block 10 is fed by one of the lines of a three phase circuit such as delta circuit 15. The terminal block is connected by lines 151, 152, 153 to each of three like transformers 16, 22, and 28 as shown in detail in FIG. 2 for operation of apparatus 47.

Each transformer has four input terminals and two output terminals and are alike in structure. In particular transformer 16 has input terminals 17A, 17B, 17C and 18; transformer 22 has input terminals 23A, 23B, 23C and 24 and transformer 28 has input terminals 29A, 29B, 29C and 30. Transformer 16 has output leads 19 and 20; transformer 22 has output terminals 25 and 26 and transformer 28 has output terminals 31 and 32. The ends of transformers 16, 22 and 28 are connected in delta connection as shown in FIGURE 2 for operation of apparatus 47.

The variable potential resistor 34 comprises a control shaft 35 which adjusts and controllably and operatively connects to resistor 34; take off lead terminal 37 connects to one end of resistor 34; the resistor is provided with input lead terminal 38 at the other end. Shaft 35 has a locknut 39.

The variable resistor 40 is provided with a control shaft 44 an input terminal 43 and an output terminal 45 and a control knob locknut 46.

The relay 50 is provided with a conventional 8-terminal socket 59; thermal relay tube 60 is provided with an 8-terminal socket 69; the relay tube 70 is provided with a conventional 8-terminal socket 79; the reset timer tube 80 is provided with a conventional socket 89.

Each socket as 59 provides for the support and operative connection of the pins of the tube located therein.

Each of the conductors connecting the elements shown in FIGURES 1 and 2 is denominated by the number of the terminal and one end of that conductor and the number of the terminal at the other end of that conductor; thus, line 25–72 connects terminals 25 and 72. The details of the wiring are given in the wiring diagram of FIGURE 2. The values of the resistances are given in Table 3.

Test panel array 150 comprises a panel support 149 and instrument support board 148. Panel support 149 comprises a continuous smooth rigid horizontal support 147 for panels as 49 and is provided with rigid upstanding arms 145 and 146 to support and space the bottom of board 49 and parts projecting therebelow from contact with board 147. Arms 145 and 146 are rigid and parallel to each other and spaced apart less than width of panel 47 and are firmly supported in surface of board 147. The instrument support panel is a rigid (½ inch plywood) vertical panel wherein are supported switches 114–116 and 130; voltmeters 110, 110A, 118, 120, 125, 123; ammeters 117, 119; clock 124; variable transformers 121, 122 and 128; test lights 103 and 127, and tube sockets as 126 and electrical connections 186–191 and 192–197 from panel 48 to transformer terminals 17A, 18, 23A, 24, 29 and 30 as are shown in FIGURE 8.

Figures 3, 4, 5, 6, 7:
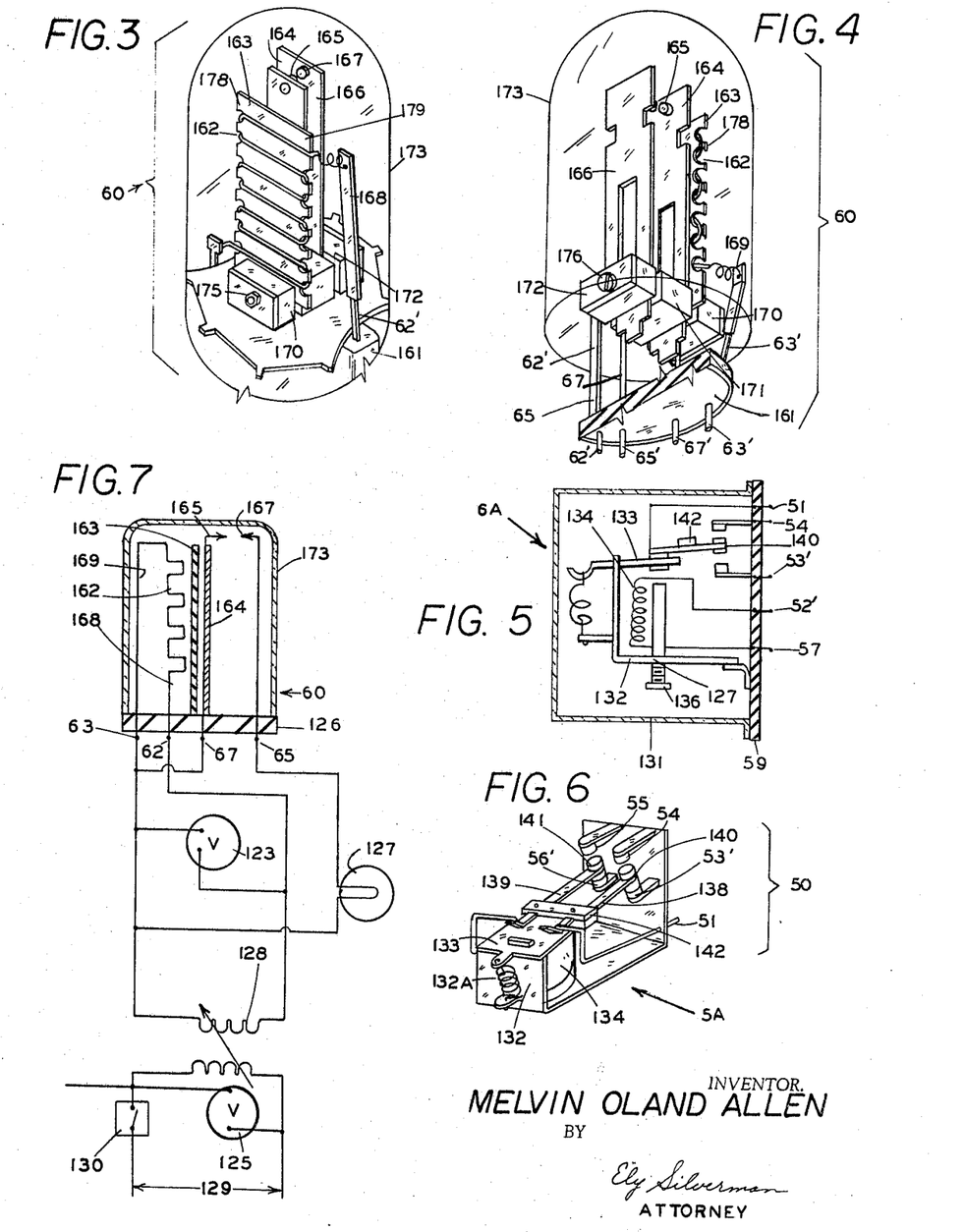
FIGURE 3 is an enlarged perspective view of elements of tube 60 seen from its top and one side, which direction of view is in the same direction as the similar tube 70 is seen in FIGURE 1.
FIGURE 4 is an enlarged perspective view of the same scale as FIGURE 3 of elements of tube 60 as seen from below and from the opposite side shown in FIGURE 3 with the shell of the tube and its base broken away below elements 170–172.
FIGURE 5 is a wiring diagram of elements in relay 50 seen in side view, as shown by direction of arrow 5A of FIGURE 6, with contact points 53 and 140 open.
FIGURE 6 is a perspective view of elements of the relay 50 in its assembled operative position with points 53 and 140 closed as seen in direction of arrow 6A of FIGURE 5.
FIGURE 7 is a schematic wiring diagram of the test circuit of zone 7A of FIGURE 1.

The tube 60 comprises a base 161, which is an electrical insulator, metallic heater coil 162, heater coil support plate 163, electrically conductive bendable bimetallic arm 164, contact point 165 thereon, electrically conductive fixed contact arm 166, contact point 167 thereon, auxiliary heater connectors 168, 169; rectangular ceramic insulating spacer elements 170, 171, 172, shell 173, arranged as shown in FIGURES 3 and 4 below described. In tube 60 the ceramic elements 170–172 are held together by a transverse bolt 176 and nut 175. The bottoms of elements 163 and 164 are held between elements 170 and 171; the bottom of element 166 is held between 171 and 172 parallel to and spaced away from 164. Points 165 and 166 are brass, hemispherical and convex, and contact each other in the electrically closed position of this tube. The side edges 179, 178 of plate 163 are denticulated by rectangular dentils. Plate 163 is mica, 1/32 inch thick, and substantially wider than arm 164, whereby there is no contact between wire 162 and plate 164. Wire 162 is wound only on one side of plate 163 and on the dentils on its side edges whereby it does not contact the sides or back of arm 164. As the base pins for elements 162, 164 and 166 passing through base 161 are stiff, auxiliary flexible metallic arms 168 and 169 are each located at one side of plate 163 in base 161 and connected to the tops of pins leading to socket terminals 62 and 63 to form a flexible reliable electric connection with the ends of the heater element 162. The shell 173 is a nonporous glass shell which forms an air-tight seal with the base 161. The space within shell 173 is substantially completely evacuated whereby the oxide coating on the curved surface of contacts 165 and 167 is kept at a minimum and overcome by a pressure corresponding to, in view of action of bimetallic 164 and element 162, a change of voltage of only one volt across terminals 62 and 63 to element 162 via pins 62′ and 63′ of tube 60.

Tube 60 is placed in socket 126 of board 148 to test the voltage required to close contacts 165 and 167. The secondary of variable transformer 128 is adjusted, in view of input voltage 129 (measured at 125) to the primary of transformer 128 to provide a "warming" voltage of 60 volts as measured at voltmeter 131, across the base pins 62′ and 63′ of element 162 of tube 60 for one minute.

While reading voltage at 123 and increasing voltage across base pins 62′ and 63′ at the rate of 1 volt per 2 or 3 seconds by adjustment of variable transformer 128, there is no complete circuit through contacts 165 and 167 (across which 120 volts are applied), as observed by light 127, yet there is lighting of light 127 at 70 volt reading. This is herein referred to as a one-volt differential. Lowering the voltage as read at 123 from 75 volts at the rate of 1 volt each 2 seconds also shows connection of circuit comprising elements 67, 164, 165, 167, 166, 65 at 70 volts but not at 69 volts for at least five minutes; at 68 volts at 123 light 127 is out for at least an hour. The contacts 165 and 167 approximate each other increasingly closer relatively uniformly as the voltage rises across element 162, e.g., from 61 to 68 volts and then contact each other, e.g., at 69 volts as read at 123 then an increment of one volt is required to effect an electrical circuit through terminals 65 and 67. Below 69 volts a separation of points 165 and 167 is observable with a magnifying glass but not between 69 and 70 volts. When the portion of shell 173 of a tube as 60 above base 161 is carefully removed from base 161 without contact with any of the components 162–172 and the thus altered tube is placed in circuit of FIGURE 7 (zone 7A of FIGURE 1) within 5 minutes of removal of the shell and exposure of the elements 162–172 to air at about 70°–80° F. an increment of 7 volts is required to effect lighting of lamp 127 after contacts 165 and 167 are in contact. An hour thereafter 11 volts are required and 8 hours thereafter 13 volts and dulling and tarnishing of the formerly bright points 165 and 167 is visible to the naked eye.

While the one volt "differential" or difference between 69 and 70 volts is characteristic of a tube useful for the apparatus 47 the absolute value at which the closure of contacts 165 and 167 occurs may vary between 65 and 73 volts.

The test voltage circuit 156 comprises:

(a) A base circuit 160 comprising in turn variable transformers 121 and 122, voltmeters 118 and 120 across the output of those transformers, ammeters 117 and 119 and two-position switch 115 in series with the output of both of the transformers and connected as shown in FIGURE 8 and (b) A transformer circuit 159 comprising in turn a group of similar step-up transformers 180, 181, 182 arrayed with their inputs in parallel, leads 186 to 191 from their secondary or output and a voltmeter 110A across such output leads and a second group of similar step-up transformers 183, 184 and 185 also arrayed with their inputs in parallel, output leads 192 to 197 and voltmeter 110 across such output and a two-way switch 114 for connection of either array 180–182 or 183–185 through that switch 114 to the base circuit 160.

Switch 114 provides for connection of the output (secondary) of variable transformer 121 or for connection of the output of variable transformer 122 to the input (primary) of transformer circuit 159 by lines 157 and 158 to the transformer circuit. The switch arm 140 of switch 114 provides for connection of group 180–182 or group 183–185 to the lines 180 and 181.

The output line 186 and 187 from the output or secondary of transformer 180 or connected to input of transformer 16 in the particular embodiment herein disclosed and lines 188 and 189 from the output of transformer 181 are connected to the input terminals of transformer 22, and the output leads 190 and 191 from the output or secondary of the transformer 182 are connected to the input terminals of transformer 28 as shown in FIGURE 8.

Terminal 18 of transformer 16 and terminal 23A of transformer 22 are jumpered to each other. However, during the test procedure using circuit 156 there is no connection of the terminals 11, 12 and 13 to the input terminals of the transformers 16, 22, and 28. The transformers 180, 181 and 182 are identical to the transformers 16, 22 and 28 however transformers 180, 181 and 182 are used as step-up transformers so that the voltage across the output of the transformers 180, 181 and 182 are each 240 volts. This 240 volts is sent into the input of transformers 16, 22 and 28 to simulate, for test purposes, operating conditions of the circuit 15. Transformers 183, 184, 185 are also identical to the transformers 16, 22 and 28 respectively and to each other and are connected to serve as step-up transformers to provide an output voltage of 480 volts across the leads 192–193, 194–195 and 196–197 respectively when 480 volts are to be simulated in the test procedure of the apparatus of 47. Accordingly, switch arm 140 of switch 114 provides for, in one position, a simulated output of 240 volts per phase while in the other position (swung to the right as shown in FIG. 8) the circuit will simulate 480 volts across the outputs of transformers 183, 184, and 185. Transformers 183, 184 and 185 are connected to transformers 16, 22, and 28 when it is desired to provide a test for calibration and of apparatus 47 for a 480 volt phase circuit. The voltage across the output of transformer 180 is read at voltmeter 110A while the voltage across transformer output 185 is read at voltmeter 110.

Generally, to set the connections and voltage of circuit 156 for calibrating the apparatus 47, the circuit 156 is connected to the portion 8D of the circuit provided in apparatus 47. The transformer circuit 159 is set at the simulated operating voltages desired, and the proper "high" and "cut off" voltage are set at the base circuit 160. Details are below given.

Portion 8D of the apparatus 47 is that portion thereof shown below the line 8B—8B in FIGURE 2 of the drawings: line 8B—8B in FIGURE 2 passes between the input terminals of the transformers 16, 22, 28 and the output terminals thereof. More particularly, the lines 186, 187, 188, 189, 190 and 191 are connected to the input terminals 17A, 18, 23A, 24, 29A and 30, respectively of transformers 16, 22 and 28 as shown in FIGURE 8 and the connections of the input terminals for the operative use thereof and shown in FIGURE 2 are removed.

Variable transformer 121 is set, in view of the reading at voltmeter 118 for proper voltage for the "high" or usual reading of the output of circuit 160, i.e. 120 volts usually. Variable transformer 122 is adjusted to provide, as read at voltmeter 120, a voltage output of the secondary of variable transformer 122 that is slightly below "cut-off voltage," e.g. 68 volts for a tube which as above tested would have an "on" voltage of 70 volts and an "off" voltage of 69 volts.

Switch 116 is a double pole switch for application of output of circuit 160 to circuit 159 or disconnection thereof. Lines 157A and 158A extend from lines 157 and 158 to switch 116A. Switch 116A is identical to switch 116 and is used for testing another apparatus 47A similar to 47 at another station on support 147. Switch 214 is identical in structure to switch 114 and is provided with a set of transformers 180A similar to set 180–183 and 183A similar to 183–185 for application of desired voltages to another apparatus 47A.

When, as an illustrative example, a 240 volt phase operation is to be applied to and controlled by the apparatus 47, calibration of that apparatus is now in order: switch 115 is set to connect transformers 180, 181 and 182 to the output lines 157 and 158 of circuit 160 and provide 240 volts at the output of transformers 180, 181 and 182 which output is read at voltmeter 110A. If 440 volts or other application is needed to manufacture a product as 47 then the arm 140 of switch 114 is closed in the other (right) direction as shown in FIGURE 8 to connect another group of transformers as 183, 184 and 185 for a 440 voltage to each of the transformers 16, 22 and 28 of the apparatus 47.

Indication that the tube 60 is "good" enough for use in apparatus 47 is shown by lighting of lamp 127 (in circuit of FIGURE 7) in one second after the closing voltage is achieved with "differential" of voltage as above described for contacts 165 and 167 of no more than 1½ volts and an absolute value of voltage required to close contacts 165 and 167 of between 67 and 73 volts. The test of "differential" of tube 60 in circuit of FIGURE 7 also provides that tube (also tube 70 which is the same as 60) a "pre-warm" so that it could then be placed in a unit as 47 without delay for further test of other components of apparatus 47.

As shown by connections in FIGURE 8, apparatus 47 is arranged for calibration of elements 34 by that 110 volts is applied across terminals 31 and 32 and test voltage of either 450, 420, 215 or 205 volts are applied across terminals 17A and 18 and across terminals 23A and 24. No voltage is applied to terminals 19 and 20 or 25 and 26 or 29A and 30. Lines 201 and 202 (in series with lamp 103) are connected to lines 101 and 102.

Table II presents the sequence of application of voltage to portion 8D of apparatus 47 during calibration of that portion of that apparatus.

The high voltage of phase of circuit 15 at which it is desired to retain connection of the pilot circuit, is read at voltmeter 110A and is set by variable transformer 121. For a 240 volt phase transformer 121 is set to read 215 volts at transformer 110A (a 300 volt range voltmeter). The low or cut-off voltage of each input circuit phase at which it is desired to have the pilot circuit break connection between the input system or circuit 15 and the load, as 109, is set by adjustment of transformer 122 and read at voltmeter 110A. In the particular embodiment herein described, the voltage at which "cut off" or disconnection of circuit 15 from the load through apparatus 47 is set at 205 volts and such "cut off" voltage read at voltmeter 110A when a 240 volt (per phase) circuit is monitored and such "cut off" voltage is set by adjustment of transformer 122 with switch 115 in the "low" voltage position and arm 140 of switch 114 in the 240 volt position. (Right for 115; left, 114.) A tube as 60 is removed from an otherwise complete apparatus 47 and a jumper plug 177 is inserted into socket 69 to "jump" out or by-pass or short circuit or shunt its sockets for tube terminals 67 and 65 as shown in FIGURE 1. Then potentiometer 34 is adjusted from its most clockwise position by a counterclockwise rotation by rotation of (as by a nonmagnetic screwdriver in a slot at the top of) shaft 36 so that, with portion 8D of apparatus 47 connected as in FIGURE 1 proper "high" voltage applied (e.g. 115 volts as read on 118 and 240 volts on 110A) will close the contacts of tube 70 connected to socket terminals 77 and 75 and light lamp 103 ten seconds after "high" voltage is applied by arm 115 of switch 115 and timer 90 being set at 10 second delay. Light indicator 103 on panel board 148 lights up to indicate that the circuit has been completed at the voltage set on voltmeter 110A.

Then arm 155 of switch 115 is set on the "low" position, for 4 seconds, by snapping its arm 155 to the "low" or "cut off" position connecting only "cut off" voltage to lines 157 and 158. Thereupon the desired normal or "high" voltage (e.g. 215 volts) is then again set on voltage switch 115 by variable transformer 121 and read on voltmeter 110A. Potentiometer 40 is rotated counterclockwise from its most clockwise position until contacts 165 and 169 across terminals 65 and 67 close: this closure is shown (with timer 90 set at zero seconds) by lighting of pilot light 103 in 10 seconds (usually 7½). Arm 155 of switch 115 is then snapped to low or "cut off" for 4 seconds. In the discussion herein of the closing of points 75 and 77 on tube 70 and 65 and 67 on tube 60 the closing is measured by the lighting of bulb 103. That is, the physical closing of the contacts (corresponding to 165 and 167 on tube 60) across terminals 75 and 77 should open in 2½ seconds after snapping of switch 115 to low. If, after that 2½ second interval, they do not open then potentiometer 34 is adjusted clockwise (as seen from above) until they do open in 2½ seconds from the time the switch 115 is thus briefly connected to provide voltage to terminals 11, 12 and 13 at which disconnection of pilot lines 101 and 102 is desired.

To expedite the timing of closure of contacts 65 and 67, of tube 60 and contacts 75 and 77 of tube 70, a switch 203 is provided to operatively connect a lapsed timer 205. The timer 205 reads in seconds and decimal fractions of seconds; it is connected automatically when the circuit through variable transformer 122 is connected to provide low or cut off voltage (420 or 205 volts) to transformers 16, 22 and 28 for terminals 67 and 65 for tube 60 by leads 206 and 206A or for terminals 75 and 77 by leads 207 and 207A by arms of switch 208. The lapsed time apparatus thereby starts when arm 155 of switch 115 is moved from high position to low position and is disconnected when contact between points 165 and 167 or 165A and 167A is removed.

After this 2½ second delay has been observed on tube 70, then high-low switch 115 is returned to high voltage position (to test if 34 was set too low).

With timer 90 set to zero seconds, lamp 103 should light within 10 seconds and usually within 7½ seconds (by second hand 124A of clock 124). After this test has been completed on tube 70, then the jumper plug or cap 177 is pulled from socket 69 and inserted at corresponding socket location into socket 79. The same tube that was in socket 79 will be replaced back in 79 after the testing and calibration of the apparatus 47 has been completed for use of apparatus 47. However, for calibration and setting of potentiometer 34 socket 79 is now "jumpered" by plug jumper wire 177 across terminals 77 and 75.

TABLE I.—SEQUENCE OF RELAY CLOSURES AT DIFFERENT VALUES OF INPUT VOLTAGE

| Time | Transformer Terminals | | | Components | | | | |
|---|---|---|---|---|---|---|---|---|
| | 29A-30 | 23A-24 | 17A-18 | 60 | 70 | 50 | 80 | 102-103 |
| T₀ | 240 [480] | 240 [480] | 240 [480] | C | C | C | C | C |
| T₁ | 205 [420] | 240 [480] | 240 [480] | C | C | C | C | C |
| T₁+1 sec | 205 [420] | 240 [480] | 240 [480] | C | C | C | C | C |
| T₁+2½ sec | 205 [420] | 240 [480] | 240 [480] | O | C | O | O | O |
| T₂ | 240 [480] | 240 [480] | 240 [480] | C | C | C | C | O |
| T₂+9 sec | 240 [480] | 240 [480] | 240 [480] | C | C | C | C | O |
| T₂+10 sec | 240 [480] | 240 [480] | 240 [480] | C | C | C | C | C |
| T₃ | 240 [480] | 205 [420] | 240 [480] | C | C | C | C | C |
| T₃+1 sec | 240 [480] | 205 [420] | 240 [480] | C | O | C | O | C |
| T₃+2½ sec | 240 [480] | 205 [420] | 240 [480] | C | O | O | O | O |
| T₄ | 240 [480] | 240 [480] | 240 [480] | C | C | C | C | O |
| T₄+9 sec | 240 [480] | 240 [480] | 240 [480] | C | C | C | C | O |
| T₄+10 sec | 240 [480] | 240 [480] | 240 [480] | C | C | C | C | C |
| T₅ | 240 [480] | 240 [480] | 205 [420] | C | C | C | C | C |
| T₅+1 sec | 240 [480] | 240 [480] | 205 [420] | C | C | C | C | C |
| T₅+2½ sec | 240 [480] | 240 [480] | 205 [420] | O | C | O | O | O |
| T₆ | 240 [480] | 240 [480] | 240 [480] | C | C | C | C | O |
| T₆+9 sec | 240 [480] | 240 [480] | 240 [480] | C | C | C | C | O |
| T₆+10 sec | 240 [480] | 240 [480] | 240 [480] | C | C | C | C | C |

LEGEND.—C = Closed; O = Open.

TABLE II.—SEQUENCE OF VOLTAGE APPLICATIONS DURING TEST

| | Nominal Voltage 480 | | | Nominal Voltage 240 | | |
|---|---|---|---|---|---|---|
| Terminal Nos. | Voltage Across Terminals | Tube 70 | Tube 60 | Voltage Across Terminals | Tube 70 | Tube 60 |
| 19/20 | 0 | On test | Jumpered | 0 | On test | Jumpered. |
| 25/26 | 0 | do | do | 0 | do | Do. |
| 31/32 | 110 | do | do | 110 | do | Do. |
| 17/18 | 450/420 | do | do | 215/205 | do | Do. |
| 23/24 | 450/420 | do | do | 215/205 | do | Do. |
| 29/30 | 0 | do | do | 0 | do | Do. |
| 19/20 | 0 | Jumpered | On test | 0 | Jumpered | On test. |
| 25/26 | 0 | do | do | 0 | do | Do. |
| 31/32 | 0 | do | do | 215/205 | do | Do. |
| 17/18 | 0 | do | do | | do | Do. |
| 23/24 | 0 | do | do | | do | Do. |
| 29/30 | 450/420 | do | do | | do | Do. |

As shown in Table II and FIGURE 8, when tube 60 is on test, 215 or 205 volts are applied to terminals 29A and 30 of transformer 28 when calibration for a 240 volt line is done but no other voltage is applied to any of output terminals of transformer 16, 22 or 28 and lines 201 and 202 are connected to lines 101 and 102.

Timing of the circuit including tube 60 at this point is checked to see if light 103 or timer 205 is "out" in 2½ seconds as done for tube 70 above; if not, potentiometer 40 is then turned counterclockwise until tube 60 cuts out lamp 103 in 2½ seconds also. Then high-low switch 115 is turned back to "high" position to check action of tube 60 on high voltage and to see that contacts 165 and 167 close within ten seconds.

In this test circuit, the closing of points 165 and 167 of tube 60 and corresponding points (165A and 167A) in tube 70 is not actually observed; it is the closing of the circuit of those points which is observed by the operator who observes the light 103 or timer 205. Lower voltage or more resistance through the potentiometers 40 and 34 is provided by clockwise (as seen form above) rotation of the control arm therefor. Each control shafts 44 and 35 is fixed in place by locknuts 46 and 39. Seven and one-half seconds is the time for contacts across terminals 65 and 67 to close the circuits through tube 60 (and 70) after connection to 420 or 205 volts input at transformer 16, 22, or 28. This alone does not close the entire circuit shown in FIGURE 2 but merely serves to set the parameters for the tubes 60 and 70; the actual time of closing of the operative circuit is set by an adjustable time delay relay 90.

The contacts 53 and 138 and 56 and 141 on tube 80 are normally open. Actuation of the coil 134 closes the contacts. Tube 80 is a particular relay used (Potter and Brumfield KRP 11AG); (other relay could of course be used).

To check on both 60 and 70 in a complete unit 47, the plug 177 that had "jumpered" from 75 to 77 is removed and tube 70 is then inserted in socket 79 and tube 60 is placed in socket 69. With switch arm 140 to the 240 volt position and 116 "closed," the switch arm 155 is then put to its "high" position. Within ten seconds after the switch arm is snapped to the high position, indicator lamp 103 lights. Then switch arm 155 is snapped to its low position. Two and ½ seconds after the switch arm is snapped to its low position, the indicator light 103 should go off; that is, there should be a 2½ second delay on the low. After light indicator 103 has "gone off" the switch arm 155 of switch 115 is thrown to the "high" position, there should be a 7½ second delay for the lamp 103 to glow (with zero elapsed time set on timer 90).

The same procedure is then begun again (setting switch 114 at 480 volt setting) if the apparatus 47 is desired to operate for a 480 volt system. The components of apparatus 47 are calibrated by the above procedure.

The connections of portion 8C of apparatus 47 are then connected as shown in FIGURE 8 after disconnection of leads 186 to 191 and 192 to 197 to terminals of transformers 16, 22, and 28.

The sequence of operation of apparatus 47 is presented in chart form in Table I during a successive sequence of instant $T_0$ to $T_6+10$ timer 90 being set at 10 seconds; thus $T_2+10$ seconds shows the delay for closure of circuit through lines 102 and 103 dependent on setting of timer 90 (10 seconds in the particular embodiment).

The voltage across the input terminals of transformers 16, 22 and 28 are shown for a 240 volt per phase circuit, and, in brackets, for a 480 volt per phase system, in Table I.

Coil 91C of counter 91 actuates standard counter and coil 92C actuates a standard signalling apparatus 91 such as a light or telemeter signal.

As the wiring connections shown in FIGURES 2 and 8 for transformers 16 and 22 provide a larger voltage difference between terminals 19 and 25 than between terminals terminals 31 and 32, the connections of wires 19–38 and 25–72 may be used (with the same connections shown for terminal leads 31 and 32) for a three-wire Y or star connected input circuit rather than the delta circuit; however for such a Y input, wire 154 would be removed, wires 18–23A would be deleted and terminals 18, 24 and 29A are connected together and line from terminal 13 to terminal 153 would be disconnected and be connected from terminal 13 to terminal 30.

The feature of FIGURE 6 is the insulated bar 142 that serves to move contact points 140 and 141 together, mechanically, while supported on metallic rigid pivoted movable frame member 133, yet keeps the electrical circuits through arms 138 and 139 separate. The tension spring 132A serves to keep points 140 and 53' and 141 and 56' open yet opening of either pair of contacts 165 and 167 or the pair 165A and 167A serves to open both pairs of contacts and avoids delays in opening the circuit through both heater elements 162 and 162A that might render the system sensitive to transient voltages concomitantly developed. Bar 142 is fixed to arms 138 and 139 and is rigid.

The tubes 60 and 70 each provide a relay circuit opening and closing action sensitive to a very small voltage differential (1 volt) that evokes a relatively large voltage change by shorting out resistences as 61 (between terminals 51 and 53) or resistance 71 (between terminals 56 and 58) and avoiding "chatter" across the terminals as 53' and 140 and 58' and 141 and effecting a rapid sharp reliable circuit closing action when the input voltage to the circuit including such tube changes in a predetermined small voltage range.

The 300 ohm resistance 61 and 500 ohm resistance through coil 162 provide a 76 volt drop across terminals 67 and 51 during normal operation of apparatus 47 as shown at $T_0$ in Table II. On failure of circuit 15 to provide in excess of cut-off voltage across a phase connected to terminals 29A and 30, the arms 138 and 139 are released by coil 134 and resistance 61 across terminals 53 and 51 comes into series with the resistance 162 and causes a further voltage drop across resistance 162 to 66 volts and causes the points 165 and 167 to open.

Similarly, failure of either of the phases connected to terminals to provide in excess of the preset cut-off voltage across terminals 17A and 24 causes arms 138 and 139 to be released by coil 134 and resistance 71 to be brought into series with resistance 162A and causes a further voltage drop across resistance 162A and a sharp opening of the circuit to pilot lines 101 and 102 and 106 and 107 and a prompt release of the load 109 from circuit 15.

While the voltages of circuit 15 were described as 240 or 480 volts per input phase (e.g. terminals 11–12, 12–13, and 11–13) the apparatus 47 could be used for control of any three-phase system, as a bank of transformers different from the particular transformers 16, 22, and 28 could be used to apply 120 volts across the pairs of output terminals 3 and 32; 25 and 26; and 19 and 29 for such input voltage in the same manner that 240 or 480 volts are applied to the input terminals of transformers 16, 22, and 28.

Tube 80 is structurally identical to tube 50. Tube 80 has a coil 134A (identical to coil 134) which serves to move arm 142A (similar to arm 142) and simultaneously move the normally open (due to a spring as 132) arms 138A and 139A (comparable to arms 138 and 139). Tube 80 provides that the load 109 is released via arm 138A breaking circuit through terminals 81 and 83 within 2½ seconds of failure of adequate voltage through heater coils 162 or 162A as above described; however, the time for reconnection of load 109 is controlled by timer 90 whereby closure of circuit through line 102 is not complete until the timer 90, after a pre-set delay of 10 seconds, reconnects the circuit through line 102, as by the conventional, normally open, relay 212.

During test and calibration of portions of apparatus 47 as above described, lines 201 and 202 are in series with the 110 voltage source, 129 and lamp 103, as shown in FIGURES 8 and 1.

In operation of the apparatus 47, a coil holding circuit, such as transformer 200, actuated by circuit 15, acts to help connect a conventional load such as a conventional wound rotor motor and starter coil 109 by, interalia, a holding coil 108 and wherein coil 108 is opposed by a slowly overcome damper spring 211.

Arms 164 and 164A are heat sensitive bimetallic electrically conductive elements.

The showings of 240 volt (in FIGURES 1 and 8) and 480 volt (in FIGURE 8) application to primary coil of transformers 16, 22, and 28 are diagrammatic only.

TABLE III.—CHARACTERISTICS OF COMPONENTS

| Reference Nos. | Item | Characteristic |
|---|---|---|
| 180, 16, 183, 181, 22, 184, 182, 28, 198. | Transformers, Westinghouse style number 323B655A40. | 0.50 KVA. |
| 60, 70 | Thermal relay tube, Amperite catalog D-70V. | R=500 ohms; complete opening time =10 secs. |
| 50, 80 | Relay tube, Potter and Brumfield, March 1967 catalog KRP11 AG. | 120 v., 50-560 cycles A.C.; 2,250 ohms; DPDT, 10 amps rating. |
| 61, 71 | Resistance | 300 ohms, 5 watt. |
| 34, 40 | Potentiometers (variable resistance) Cental Lab. Co. 3N303. | 30,000 ohms, 5 watt. |
| 90 | Timer, Potter and Brumfield type CHB 38-70003. | 120 volt; 10 amp rating; time delay range 1 to 180 secs. |
| 205 | Time lapse counter, Tymeter Electronics #90. | 60 second range. |

| Terminals | Apparatus 47 Operative | Voltage Drop ±2% |
|---|---|---|
| 43 to 45 | Across 40, arm 140 open | 40 |
| 45 to 53 | Across 61, arm 140 open | 3.2 |
| 53 to 62 | Across 162, arm 140 open | 68 |
| 38 to 37 | Across 34, arm 141 open | 148 |
| 37 to 56 | Across 71, arm 141 open | 3.5 |
| 56 to 72 | Across 162A, arm 141 open | 66 |
| 43 to 47 | Across 40, arm 140 closed | 44 |
| 45 to 53 | Across 61, arm 140 closed | 0 |
| 53 to 62 | Across 162, arm 140 closed | 76 |
| 38 to 37 | Across 34, arm 141 closed | 163 |
| 37 to 56 | Across 71, arm 141 closed | 0 |
| 56 to 72 | Across 162A, arm 141 closed | 74 |

Although in accordance with the provision of the patent statutes, particular preferred embodiments of this invention have been described and the principles of the invention have been described in the best mode in which it is now contemplated applying such principles, it will be understood that the operations, constructions and compositions shown and described are merely illustrative and that my invention is not limited thereto and, accordingly, alterations and modifications which readily suggest themselves to persons skilled in the art without departing from the true spirit of the disclosure hereinabove are intended to be included in the scope of the annexed claims.

I claim:

1. A polyphase circuit protective arrangement comprising:
   (a) three terminals for application of each of the three phases of a polyphase system thereto,
   (b) a first thermal time delay relay circuit operatively connected at its ends to means sensitive to the voltage in one of said phases,
      a first pair of electrical contacts, a first bimetallic arm supporting one of said contacts, said arm near to but out of contact with the heater element,
      said heater element in series with a resistance, said resistance connected in parallel with a normally open switch operatively connected to a closing electro-magnetic coil therefor,
      a second thermal time delay circuit operatively connected at its ends to means sensitive to the vector sum of voltages in the other phases of the polyphase system,
      said circuit comprising a second heater element, a second pair of electrical contacts, a second bimetallic arm supporting one of said second pair of contacts, said second arm being near to but out of contact with said second heater element,
      said second heater element in series with a second resistance, said resistance connected in parallel with normally open second switch operatively connected to said electromagnetic coil for closing of said second switch,
   (c) a relay control circuit comprising said first pair of contacts and said second pair of contacts and said second pair of contacts and said relay control circuit being connected across one of said phases, and
   (d) a pilot circuit comprising a normally open second magnetic relay in parallel with said magnetic coil and comprising a second relay coil also in series with both said pairs of contacts, a timer in parallel with said second relay coil, and two pilot line conductors,
      a switch operated by said second relay coil in one pilot line conductor, and said timer operatively connected to a second switch in said two pilot line conductor.

2. Apparatus as in claim 1 wherein each of the first and thermal delay circuits includes two resistances in series with the heater element, and the second resistance is directly in series with the heater element and, in operation of the apparatus, has a voltage fall therethrough larger than the voltage required across the heater to electrically close the contacts thereof from their open position and said second resistance is shunted by the normally open switch on operation of the magnetic coil therefor.

3. Apparatus as in claim 2 comprising also:
   (e) three transformers, the primary coil of the first transformer of said three transformers connected across the first and third of said terminals, the primary coil of the second transformer connected across the second and third terminals and the primary coil of the third transformer connected across the first and second of said terminals,
      said first thermal relay and relay resistor being in series across the secondary coil of said first transformer and the second thermal time delay circuit being connected at one end to the second and at its other end to the third transformer, said transformers being connected in delta arrangement,
   (f) a conductor connected at one end to the secondary coil of the third transformer and at its other end to the secondary of the second transformer, said one end electrically located between said connection of third transformer to the second thermal time delay circuit and the secondary coil end corresponding to that end at which its primary is connected to the second transformer, and the other end of the conductor is connected to the secondary of the second transformer between the connection of the second thermal delay relay circuit thereto and the end of the secondary coil corresponding to the end of the primary coil of that transformer connected to the first transformer.

4. Apparatus as in claim 3 wherein each of said heater elements and the contact points adjacent thereto is located in a gas-tight shell, there is an atmosphere within said shell and said atmosphere is inert toward the surface of said contact points.

5. Calibrating apparatus for a polyphase circuit protective arrangement comprising:
   (a) a base circuit comprising first and second variable transformers, first and second voltmeters across the output of those first and second transformers, respectively, and a first two-position switch in series with the output of both of the transformers, and
   (b) a transformer circuit comprising a first group of three similar step-up transformers arrayed with their inputs in parallel, leads from their secondary or output and a third voltmeter across such output leads and a second group of similar but higher voltage step-up transformers also arrayed with their inputs in parallel, output leads and a fourth voltmeter across such output and a second two-way switch for connection of either the first or second group through that second two-way switch for connection to the base circuit, a time lapse timer connected across the output of said first variable transformer with a plurality of test leads attached thereto, and a power source operatively connected to one of said first and second transformers.

6. Process of calibrating apparatus comprising a polyphase circuit protective arrangement modified for calibration and comprising:
  (a) three terminals for application of each of the three phases of a polyphase system thereto,
  (b) a first thermal time delay relay circuit operatively connected at its ends to means sensitive to the voltage in one of said phases,
      a first pair of electrical contacts, a first bimetallic arm supporting one of said contacts, said arm near to but out of contact with the heater element,
      said heater element in series with an adjustable resistance, said resistance connected in parallel with a normally open switch operatively connected to a closing electromagnetic coil therefor for closure thereof on coil activation,
      a second thermal time delay circuit operatively connected at its ends to means sensitive to the vector sum of voltages in the other phases of the polyphase system,
      said circuit comprising a second heater element, a second pair of electrical contacts, a second bimetallic arm supporting one of said second pair of contacts, said second arm being near to but out of contact with said second heater element, said second heater element in series with a second adjustable resistance, said resistance connected in parallel with a normally open second switch operatively connected to said electromagnetic coil for closing of said second switch,
  (c) a relay control circuit comprising said first pair of contacts and said second pair of contacts and said second pair of contacts and said relay control circuit being connected across one of said phases, and
  (d) a pilot circuit comprising a normally open second electromagnetic relay in parallel with said magnetic coil and comprising a second relay coil also in series with both said pairs of contacts, a timer in parallel with said second relay coil, and two pilot line conductors,
      a switch operated by said second relay coil in one pilot line conductor, and said timer operatively connected to a second switch in said two pilot line conductors,
  (e) three transformers, the primary coil of the first transformer of said three transformers connected across the first and third of said terminals, the primary coil of the second transformer not connected across the second and third terminals and the primary coil of the third transformer not connected across the first and second of said terminals,
      said first thermal relay and relay resistor being in series across the secondary coil of said first transformer and the second thermal time delay circuit being connected at one end to the second and at its other end to the third transformer, the primaries of said transformer being separate from each other,
  (f) a conductor connected at one end of the secondary coil of the third transformer and at its other end to the secondary of the second transformer, said one end electrically located between said connection of third transformer to the second thermal time delay circuit and the secondary coil end corresponding to that end at which its primary be connected to the second transformer were the three transformers connected in delta arrangement, and the other end of the conductor is connected to the secondary of the second transformer between the connection of the second thermal delay relay circuit thereto and the end of the secondary coil corresponding to the end of the primary coil of that transformer connected to the first transformer primary coil were the three transformers in delta arrangement, by operatively connecting thereto a calibrating apparatus comprising:
  (g) a base circuit comprising first and second variable transformers, first and second voltmeters across the output of those first and second transformers, respectively, and a first two-position switch in series with the output of both of the transformers, and
  (h) a transformer circuit comprising a first group of three similar step-up transformers arrayed with their inputs in parallel, leads from their secondary or output and a third voltmeter across such output leads, and a second group of similar but higher voltage step-up transformers also arrayed with their inputs in parallel, output leads and a fourth voltmeter across such output and a second two-way switch for connection of either the first or second group through that second two-way switch to the base circuit, a time lapse timer connected across the output of said first variable transformer with a plurality of test leads attached thereto, and a power source operatively connected to both of said first and second transformers;
      short circuiting the second pair of electrical contacts in the second thermal time delay relay circuit and then
      applying to the primary of first transformer the minimum voltage at which connection of the pilot circuit is desired, and,
      then applying to the first transformer the maximum voltage at which disconnection of the pilot circuit is desired,
      then increasing the first variable resistance in the first thermal time delay circuit until said first pair of electrical contacts theretofore closed first open, ceasing said short circuiting and removing said voltage applied to said first transformer and then
      short circuiting the first pair of electrical contacts in the first thermal time delay circuit and then
      applying to the primary coils of the second and third transformers the vector sum of the minimum voltage at which connection of the pilot circuit is desired, and
      applying power to the relay control circuit while separate from said one phase, and
      then applying to the second and third transformers the maximum voltage at which disconnection of the pilot circuit is desired, and then
      increasing the second variable resistance in the second thermal time delay circuit until said second pair of electrical contacts, theretofore closed, first open,
      and then ceasing the short circuiting of said first pair of electrical contacts.

7. Process as in claim 6 wherein the second adjustable resistance is lowered until the second pair of contacts opens after the same time interval following removal of said minimum voltage at which connection of the pilot circuit is desired thereto and application of said maximum voltage at which disconnection of the pilot circuit is desired as the time interval following removal of said minimum voltage at which connection of the pilot circuit is desired thereto and application of said maximum voltage at which disconnection of the pilot circuit is desired provided for the first pair of contacts in the first thermal time delay circuit.

8. Process as in claim 6 wherein the first adjustable resistance is lowered until the first pair of contacts opens in about 2½ seconds after release of the said minimum voltage at which connection of the pilot circuit is desired and simultaneous application thereto of said maximum voltage at which disconnection of the pilot circuit is desired.

References Cited

UNITED STATES PATENTS

| | | | |
|---|---|---|---|
| 2,441,979 | 5/1948 | Schmidinger et al. | 317—22 |
| 2,611,009 | 9/1952 | Cuttino | 317—22 |
| 2,838,717 | 6/1958 | Breeding et al. | 317—22 |
| 3,056,067 | 9/1962 | Luber | 317—22 XR |
| 3,258,647 | 6/1966 | Clark | 317—22 XR |
| 3,382,411 | 5/1968 | Field | 317—22 XR |

JOHN F. COUCH, Primary Examiner

W. M. SHOOP, Jr., Assistant Examiner

U.S. Cl. X.R.

317—46; 324—28